United States Patent [19]

Van Kreuningen et al.

[11] 4,272,796
[45] Jun. 9, 1981

[54] AUTOMATIC CASSETTE CLEANER

[75] Inventors: Rudolf Van Kreuningen, Torrance; Dan O. Ray, Rowland Heights, both of Calif.

[73] Assignee: Kraco Enterprises, Inc., Compton, Calif.

[21] Appl. No.: 53,299

[22] Filed: Jun. 29, 1979

[51] Int. Cl.³ .............................................. G11B 5/41
[52] U.S. Cl. ................................... 360/128; 360/137; 15/210 R
[58] Field of Search ....................... 360/128, 137, 132; 15/210 R

[56] References Cited

U.S. PATENT DOCUMENTS

| | | | |
|---|---|---|---|
| 3,955,214 | 5/1976 | Post et al. | 15/210 R X |
| 4,141,053 | 2/1979 | Kara | 19/97 R |
| 4,149,206 | 4/1979 | Loiselle | 15/210 R X |

FOREIGN PATENT DOCUMENTS 52-18306  8/1975  Japan ................................. 360/128

Primary Examiner—John H. Wolff
Attorney, Agent, or Firm—Fulwider, Patton, Rieber, Lee & Utecht

[57] ABSTRACT

The device for automatically cleaning operating parts of a cassette tape deck is provided. The apparatus is enclosed in the frame of a standard cassette. Tape head cleaning is accomplished by a cleaning pad reciprocally moved across the tape head. An arm on which the pad is located is driven by cams powered by the take-up spindle of the tape deck. Capstan and pinch roller cleaning occurs when a second cleaning pad is spring biased against them as they turn. Solvents can be added to the cleaning pads to dislodge deposits.

7 Claims, 4 Drawing Figures

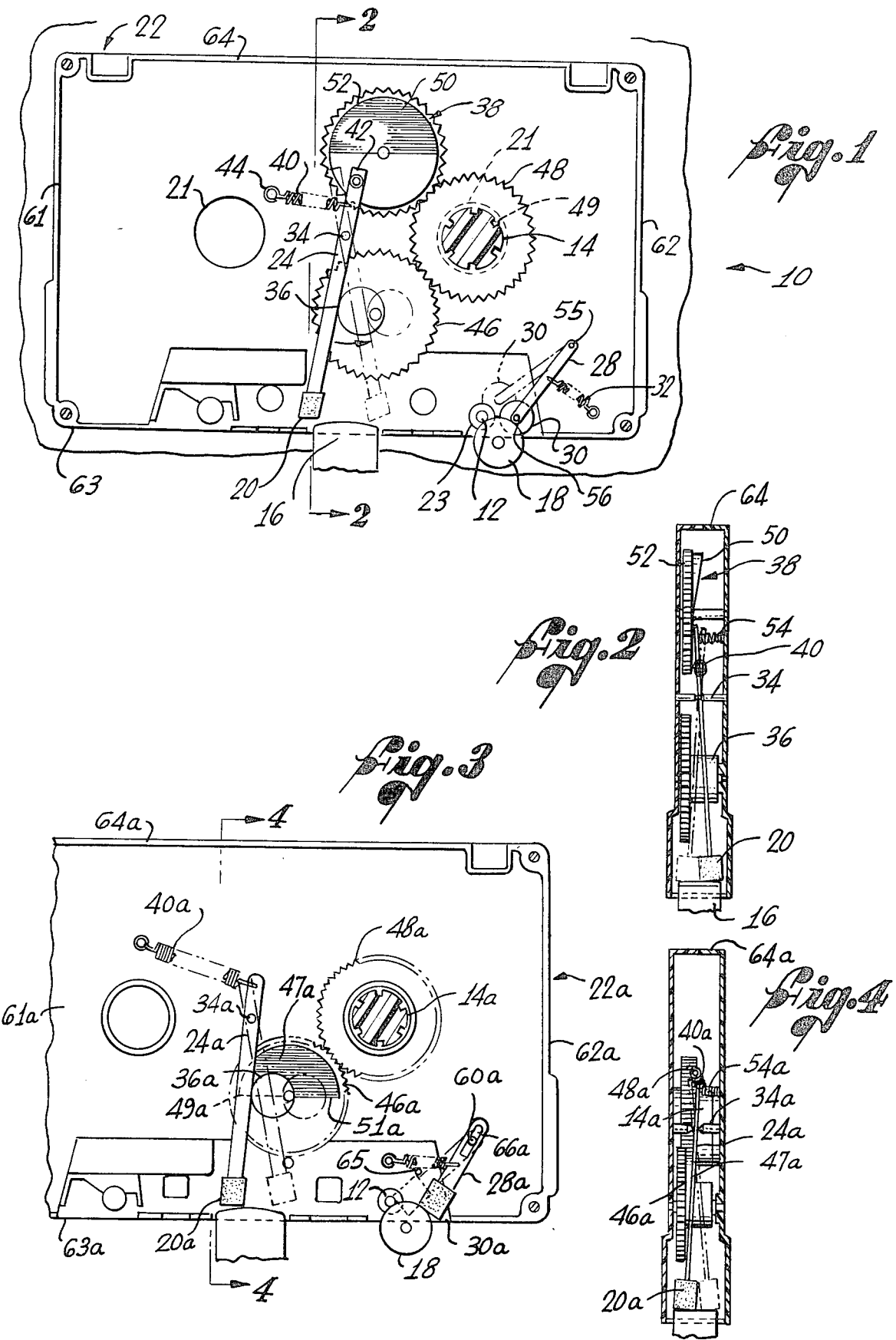

AUTOMATIC CASSETTE CLEANER

BACKGROUND OF THE INVENTION

This invention relates generally to cassette tape deck players and recorders, and, more particularly, to cleaning devices driven by the tape deck which automatically clean a tape head and tape transport mechanism in the tape deck.

The magnetic tape used in cassette tape cartridges is coated with iron oxides which tend to become dislodged from the tape as the cartridge is used. Loose particles of the coating and other dirt can degrade the performance of the tape deck by accumulating on the tape deck's magnetic heads and also on the deck's capstan and pinch roller. Currently, accumulations can be removed by manually swabbing them off with solvent and an absorbent medium such as cotton.

Cleaning with swabs and solvents is an effective method of removing accumulations, but is time consuming and messy. In tape decks in which the cassette slides into the deck through a narrow slot such as those used in some automobile installations, the heads and transport mechanisms are inaccessible unless the unit is disassembled and, hence, the heads and transport mechanisms in such units are extremely difficult to manually clean.

Prior to this invention, tape heads which were not easily accessible could be cleaned by a cleaning device which utilizes an abrasive band located in a standard cassette. The band is driven by the tape deck's tape transport mechanism and the band removes accumulations from the head as it rubs across the tape head. In a band cleaning device, the cassette is inserted into the tape deck and when the tape deck is activated, the band rubs across the head cleaning the head by abrasive action. The little cleaning of the capstan and pinch roller which does occur in band cleaners results from the direct contact of the band with the roller and capstan rather than sliding movement of the band across them.

The abrasive band is not an entirely satisfactory cleaner and it suffers several disadvantages. When used frequently, its abrasives tend to wear the tape head. Further, the band can clean only that part of the head over which it passes thus it leaves accumulations above and below the edges of its band and also both forward and behind the point where the band contacts the head.

The band is not absorbent and cannot make use of cleaning solvents which are useful in loosening and removing accumulations. Instead the band must rely on being pressed against the tape head by a light pressure of a tape head pad which is designed to hold a playing tape against the tape head not to act as part of a cleaning system.

The band cleaner is extremely poor for cleaning the capstan and pinch roller. No cleaning results because the band does not slide across the capstan and pinch roller.

Consequently, there existed a need for a cleaning apparatus contained in a cassette body which can clean the tape heads and the transport mechanism of the tape deck. A desirable device would use solvent to loosen the dirt and wiping action of a cleaning pad to remove the loosened dirt. The device should be able to clean an area wider than the width of the tape and must be able to effectively clean the capstan and pinch roller.

SUMMARY OF THE INVENTION

The present invention comprises a cleaning apparatus, or cleaner, enclosed in a standard tape cassette which ulilizes power from a tape transport mechanism of a conventional tape deck to operate its cleaning means. A head cleaning portion of the cleaner includes a frame that holds and locates the apparatus, a resilient cleaning means that accomplishes head cleaning by swabbing the tape head with a cleaning swab mounted on a reciprocatingly moving arm.

A capstan and pinch roller cleaning portion of the cleaner includes a second resilient cleaning means that accomplishes capstan and pinch roller cleaning. This second cleaning means is held in contact with the capstan and pinch roller by a second arm which holds the means against the capstan and pinch roller so that they are wiped as they turn after the tape deck is activated.

In one embodiment of the invention, the frame is configured to be identical to the frame of a standard cassette. The frame is inserted into a tape deck and the tape deck is operated. A drive spindle of the tape deck which normally turns the take up reel of a tape cassette turns a transmission gear in the cleaner. The transmission gear is engaged to gears that operate cam means acting to move a head cleaning or first arm in reciprocating motion across the head both in a direction parallel to the tape as the tape moves across the tape head, hereafter called parallel to the path of the tape, and in a direction perpendicular to and in the same plane as the tape as it moves across the tape head, hereafter called perpendicular to the path of the tape. The reciprocating motion occurs about the point where the arm is pivotably connected to the frame.

One means for driving the head cleaning arm is a cylindrical cam affixed atop a spur gear that is driven by the transmission gear. Spring means bias the arm against the cam so that the arm acts as a cam follower. This cylindrical cam drives the arm in a direction parallel to the path of the tape. A second cam means for driving the arm is an inclined plane or ramp atop a second spur gear that is also driven by the transmission gear. The ramp drives the arm, which is spring-biased against the ramp, in a direction perpendicular to the path of the tape. In order to insure complete wiping coverage of the cleaning means over the tape head, the two cam driving gears have a different number of teeth, and thus the period of reciprocation parallel to the tape path differs from the period of reciprocation perpendicular to the tape path.

Capstan and pinch roller cleaning is accomplished by a resilient cleaning roller which is held in contact with the capstan and pinch roller by a capstan cleaning or second arm. One end of the capstan cleaning arm is pivotably attached to the frame, and spring means bias the arm to a position adjacent the pinch roller. The cleaning roller is rotatably connected to another end of the capstan cleaning arm. As the tape deck is activated the pinch roller advances, contacts the cleaning roller and moves the cleaning roller adjacent the capstan. The spring holds the cleaning roller in this position where it contacts the capstan and pinch roller, which are rotating in opposite directions. The roller slides across both the capstan and roller removing accumulations of dirt from both.

In a second embodiment of the invention the two cam means driving the head-cleaning arm are both located on one cam gear. A semicircular vertical cam, or ramp, lies adjacent the cylindrical cam atop the cam gear. The ramp is positioned so that the arm is moved in the direction perpendicular to the tape path when the cylindrical cam has moved the arm to its maximum displacement parallel to the tape path. Thus, the arm describes a rectangular trace, that is, it moves across the head first parallel to the tape path, then it moves perpendicular to the path, then it moves back parallel the tape path but on a different line, and finally it moves back perpendicular but on a different path to the starting position. This trace encompasses a sufficiently large rectangle so that all the head is wiped, yet the area is small enough to insure there are no gaps in the center of the wiped area.

The second embodiment features a different capstan cleaner. A non-rotating resilient cleaning means is mounted on the end of a capstan cleaning arm. This arm moves within the frame by sliding along its longitudinal axis as well as by pivoting about the point where it is connected to the frame. Spring means bias the arm toward a position extended toward the capstan and against a post that prevents the arm from rotating clockwise out of position. As the tape deck is activated and the pinch roller moves toward the cleaning pad, the spring bias holds the non-rotating cleaning pad against the rotating capstan and pinch roller. The cleaning pad slides across the capstan and pinch roller and thereby cleans them.

Other aspects and advantages of the invention will become apparent from the following detailed description, taken in conjunction with the accompanying drawings.

BRIEF DESCRIPTION OF THE DRAWING

FIG. 1 is a top plan view of an embodiment of a cleaning cassette positioned in a tape deck, with a top portion of a frame removed to show the cleaning mechanism inside;

FIG. 2 is a section view taken substantially along line 2—2 of FIG. 1 showing an inclined plane atop one gear;

FIG. 3 is a top plan view of an alternate embodiment of the invention having a different cleaning mechanism; and FIG. 4 is a section view taken substantially along line 4—4 of FIG. 3 showing an inclined plane atop one gear.

DETAILED DESCRIPTION

As shown in the drawings for purposes of illustration, the invention is embodied in cleaning device 10 located within a tape cassette capable of being inserted into any cassette tape player/recorder (not shown), hereafter the "tape deck". The cleaner 10 is activated by a tape capstan 12 and a take up or drive spindle 14 of the tape deck and when so activated, the cleaner automatically cleans the entire surface of a magnetic tape head 16 as well as the capstan 12 and a pinch roller 18 of the tape deck. The cleaner uses a cleaning pad 20 for wiping the tape head 16 and is particularly well suited for use with liquid tape head cleaning solutions.

In general, the cleaner comprises a frame 22 and cleaning apparatus, located within the frame, which accomplishes the desired cleaning. The frame 22 is identical in appearance to a standard cassette having two center holes 21 for accommodating the drive spindle 14 of the tape deck, and a hole 23 for accommodating a capstan 12. Through said holes the drive spindle 14, the capstan 12 and the pinch roller 18 of the tape deck can engage the cleaning apparatus.

In accordance with the present invention, the apparatus for cleaning the tape head 16 comprises an elongated head cleaning or first arm 24, pivotably connected to the frame 22, the arm 24 mounting on one end the pad 20 adapted for cleaning the tape head 16; and the arm 24 being connected to cam means which move the arm in reciprocation across the tape head in two directions perpendicular to each other and thereby producing a wiping action of the pad 20 across the tape head 16. The invention also includes means for cleaning the capstan 12 and pinch roller 18 comprising a capstan cleaning, or second, arm 28 pivotably connected at one end to the frame 22 and having a cleaning surface 30 at the other end which is held against the capstan 12 and pinch roller 18 by spring means 32 that act to bias the cleaning surface 30 into engagement with the capstan and pinch roller.

As is shown in FIG. 1, the head cleaning arm 24 mounting the head cleaning pad 20 is a generally rectangular flat shaft made of non ferrous metal or other suitably strong non ferrous material. The arm is attached to the frame 22 by means of a pivot shaft 34 attached to the frame at a point between the center holes 21. The pivot 34 is most suitably a set of plastic pins inserted in the frame 22, but other construction is possible. The arm 24 is connected to the pivot shaft 34 in a manner allowing said arm 24 to pivot about said shaft 34 such that the pad mounted on the arm moves in both a direction parallel to the tape as the tape moves across the tape head, hereafter called both in the description and in the claims a direction parallel to the tape path, and a direction perpendicular to and in the same plane as the tape as it moves across the tape head hereafter called both in the description and in the claims a direction perpendicular to the tape path.

The cleaning pad 20, attached to the arm adjacent the tape head 16, is a rectangular solid composed of a resilient porous material such as a synthetic sponge or felt. Because the pad 20 is resilient, the cassette can be used in tape decks made by different manufacturers even though the location of tape head 16 may differ from tape deck to tape deck. Furthermore, because the pad 20 is resilient it can be made thick enough to attain a close contact with the tape head 16 yet it is still be compressible enough to ensure that it exerts a generally uniform force against the tape head 16. It is desirable that the pad material be capable of absorbing and holding a liquid cleaner of the type used to clean tape heads.

The wiping motion of the arm is provided by two cams means: a first cam means 36 moving the arm 24 in a direction parallel to the path of the tape past the tape head 16; and a second cam means 38 moving the arm perpendicular to the tape path. Reciprocation of arm 24 parallel to the tape path is produced by the action of the first cam means 36, herein a cylindrical cam which engages the arm at a position between the pivot point 34 and the cleaning pad 20. An alternative cam means for providing such reciprocation parallel to the tape path is a grooved track device.

Spring means 40 are used to bias the arm 24 against the cam 36. One method of constructing and locating the spring means 40 is to attach one end of a coil spring to the arm 24 at a location between the pivot point 34 and the end 42 of the arm opposite the wiping pad or inward end, and to attach the other end of the spring to an attachment point 44 on the frame located on the opposite side of the arm from the cam 36.

The cylindrical cam 36 lies atop and is an integral part of a cam gear 46. The cam gear is a flat spur gear composed of any material having sufficient strength and hardness to resist deformation and wearing of the gear's teeth. When the frame 22 is viewed from a position overhead and perpendicular to the frame, the vantage point used in FIG. 1, the cam gear is seen lying about midway between the left 61 and right sides 62 of the cassette, and about one third of the distance between the side 63 of cassette adjacent the tape head 16 and the side 64 of the cassette opposite the tape head.

A transmission gear 48, another spur gear, lying in the same plane as and adjacent to the cam gear 46 provides power to the cam gear 46. The transmission gear 48 is located in the position where the take up reel in a standard cassette is placed. A hole 49 in the center of the transmission gear 48 is configured to mateably engage the spindle 14 of the tape deck which normally drives the take up reel of a standard cassette. The transmission gear 48 is composed of any material having sufficient strength and hardness to resist both deformation and wearing of the gear's teeth.

Reciprocation of the cleaning arm 24 in a direction perpendicular to the tape path is produced by the cam-like action of an inclined surface 50, shown in FIG. 2, atop a ramp gear 52. The ramp gear 52 is another spur gear made of a material similar to that used in the other gears. The ramp gear 52 lies in the same plane as and is adjacent to the transmission gear 48. It is located about midway between left 61 and right 62 sides of the frame 22 and about one third of the distance from the side 64 of the cassette opposite the tape head 16 to the side 63 of the cassette adjacent the tape head. This location of the ramp gear 52 permits the inward end 42 of the arm 24 to overlie the ramp gear.

As the ramp gear 52 is driven by the transmission gear 48, the height of the upper surface of the ramp above the gear varies because of the inclination of its upper surface 50. This varying height of the ramp 50 on the ramp gear 52 drives the inward end 42 of the arm, which contacts the ramp in a reciprocation in a direction perpendicular to the tape path. A vertical spring means 54 located near the inward end 42 of the arm biases the outward end against the inclined surface 50 of the ramp gear 52. The cam driven reciprocation of the inward 42 of the arm causes the arm 24 to pivot about the pivot 34 and thereby causes the cleaning pad 20 to reciprocate and wipe the tape head 16 in the direction perpendicular to the tape path.

The number of teeth in ramp gear 52 varies from the number of teeth in the cam gear 46. Such difference in the number of teeth in the gears 46 and 52 causes the two gears, both of which are driven by the same transmission gear 48, to rotate at different speeds and to produce a different periodicity for the reciprocation of the arm 24 parallel to the tape path from that reciprocation perpendicular to the tape path.

Cleaning of the capstan 12 and the pinch roller 18 is accomplished by second cleaning means herein a cylindrical cleaning roller 30. The cleaning roller 30 is rotatably mounted on the capstan cleaning arm 28 at an end of the arm adjacent the capstan 12 and pinch roller 18.

The cleaning roller 30 is composed of an absorbent resilient material of a type similar to the material used in the cleaning pad 20. The end of the capstan cleaning arm 28 opposite the capstan is pivotably attached to the frame 22 at a pivot 55 position which is near the right side 62 of the frame, viewed from a position overhead and perpendicular to the frame as in FIG. 1, and about one third the distance from the side 63 of the frame adjacent the tape head to the side 64 opposite the tape head. The capstan cleaning arm 28 is a generally rectangular elongated member and is configured so as to receive and support a pin 56 which passes through the central axis of the cleaning roller 30 and connects the roller to the arm.

For the purpose of maintaining the cleaning roller 30 forcefully engaged against the capstan 12 and pinch roller 18, the cleaning roller 30 is located so that it lies within a position to which the pinch roller 18 advances in a direction toward the cassette when the tape deck is activated. When the tape deck is activated and the pinch roller 18 moves into the advanced position adjacent the capstan 12, the pinch roller pushes the cleaning roller 30 in a clockwise direction about the pivot 55 to a position adjacent both the capstan 12 and pinch roller 18, shown in phantom line in FIG. 1. Spring means 32, such as a coil spring, connected to the capstan cleaning arm 28 and to the frame 22 biases the arm in the counterclockwise direction about its pivot 54. In this way the spring 32 tends to hold the cleaning roller 30 against the capstan 12 and pinch roller 18.

A second embodiment of the invention in which the means driving the tape head cleaning arm 24 and the means for cleaning the capstan 12 and pinch roller 18 differ from those in the embodiment described above is illustrated in FIGS. 3 and 4. The second embodiment of the cleaner 10 is an automatic cleaning device similar to that previously discussed and illustrated in FIGS. 1 and 2; and parts of the cleaner of FIGS. 3 and 4 which find substantial correspondence in structure or function to those previously discussed in connection with FIGS. 1 and 2 have been designated with corresponding numerals having an "a", to wit 10a. In this second embodiment the reciprocating motion of the cleaning arm 24a in both a direction parallel to the tape path and a direction perpendicular to the tape path results from cam means on a single cam gear 46a. The cam gear 46a in this embodiment has a cylindrical cam 36a located in its upper surface, as does the cam gear 46 of the first embodiment. Additionally, the cam gear has on its upper surface cam means 47a for producing reciprocating motion perpendicular to the tape path, herein a semicircular ramp.

The ramp 47a produces reciprocation of the arm 24a in a direction perpendicular to the tape. The ramp 47a extends from a starting position 49a where the surface of the cylindrical cam 36a is closest to the outer diameter of the gear 46a, to an ending position 51a which is 180 degrees across the gear. These positions for the start 49a and end 51a of the ramp are used in order that the arm 24a and cleaning pad 20a will describe a box-shaped cleaning pattern on the tape head 16 which pattern cleans the entire head 16.

The starting position 49a of the ramp 47a is positioned so that the movement of the arm 24a in a direction parallel to the tape path toward the left side 61a of the frame 22a is ending as the ramp engages the arm. As the arm 24a stops moving in a direction parallel to the tape path, the ramp 47a moves the arm 24a a direction perpendicular to the tape path and away from the tape deck. Similarly the ending position 51a of the ramp 47a is located so that movement of the arm 24a in the direction perpendicular to the tape path and toward the tape deck occurs as the arm stops its movement parallel to the tape path toward the right side 62a of the frame 22a.

The device operates as follows. As the cylindrical cam 36a moves the arm 24a to a position where the arm and pad 20a are displaced in a direction parallel to the tape path to a position closest the left side 61a of the frame 22a, the ramp 47a starts and moves the arm in a direction perpendicular to the tape path away from the tape deck. The gear 46a continues turning and as the pad 20a moves across the head toward the right side 62a of the frame 22a and wipes a trace that is further away from the tape deck than the trace it made when it was moving left toward the left side 61a. When the arm 24a is fully displaced by the right and movement parallel to the tape path has ceased, the ramp 47a ends and the arm 24a and cleaning pad 20a move toward the tape deck. Thereafter the pad 20a moves to the left describing a trace closer to the tape deck than the trace it made as it moved to the right.

In this second embodiment, the capstan 12 and the pinch roller 18 are cleaned by a rectangular cleaning pad 30a fixedly attached to an end of the capstan cleaning arm 28a. The elongated arm 28a is connected to the frame 22a by slidable guide means which include a guide pin 60a attached to the frame and a slot 66a in the arm parallel to the longitudinal axis of the arm. The slot 66a and the guide pin 60a cooperate to hold the arm yet to allow the arm 28a to rotate about the pin 60a and to allow the arm to translate in a direction parallel to the longitudinal axis of the arm. Rotation of the arm 28a clockwise beyond a position where the cleaning pad is adjacent the capstan 12 and the pinch roller 18 is prevented by a guide post 65 attached to the frame 22a at a position where it engages a left side of the arm 28a, viewed from a point overhead and perpendicular to the frame 22a the vantage point used in FIG. 3, when the arm is adjacent to the capstan and pinch roller.

From the foregoing it will be appreciated that the present invention provides an apparatus for automatically cleaning the tape head 16, capstan 12 and pinch roller 18 of a conventional tapedeck by using the drive mechanism of the tapedeck to provide the operating power. The apparatus is enclosed in a container shaped like a standard cassette which is inserted into the tapedeck in the conventional manner. When activated, the tape transport motor of the tapedeck powers one or two cams which move an arm 24 and the attached wiping pad 20 in reciprocation in directions both parallel to the tape path and perpendicular to the tape path. The cam action is designed to assure that the entire head 16 is cleaned. The tape deck capstan 12 powers the pinch roller 18 and against the two of them lies a cleaning roller 30 or other pad which cleans both the capstan and pinch roller.

The cassette cleaner cleans the entirety of the tape head 16 and does so without abrasives. It also cleans a wide surface of the capstan 12 and the pinch roller 18 which includes those areas adjacent to the tape path in which the build up of dirt frequently occurs. Cleaning is accomplished by absorbent pads capable of holding solvents that assist in removing dirt. The cassette cleaner needs no adjustment and may be used in any standard size tape deck.

While two particular forms of the invention have been illustrated and described, it will be apparent that various other modifications can be made without departing from the spirit and scope of the invention.

We claim:

1. For use with a cassette tape deck which moves recording tape in a standard cassette in a path adjacent to and past a play and/or record tape head, an apparatus for cleaning the tape head utilizing power from the tape transport means of the cassette tape deck, comprising:
   a frame;
   an arm having a first end terminating nearly adjacent to the tape head;
   a cleaning pad attached to said first end of said arm adapted to wipe across said tape head;
   pivot means for pivotally supporting said arm within said frame about a pivot point to allow motion of said cleaning pad both parallel to and perpendicular to the tape path; and
   driving means for effecting reciprocal motion of said arm parallel and perpendicular to the tape path.

2. The apparatus described in claim 1, wherein said driving means includes an engaging means for engaging the tape transport means of the cassette tape deck.

3. The apparatus described in claim 1 wherein said driving means comprise:
   a first arm driving means adapted to be driven by said tape transport means and to drive said arm about said pivot means in a direction parallel to said tape path;
   a first spring biasing said arm into contact with said first arm driving means;
   a second arm driving means adapted to be driven by said tape transport means and to drive said arm about said pivot means in a direction perpendicular to said tape path;
   a second spring biasing said arm into contact with said second arm driving means;
   a transmission gear inside said frame adapted to engage said tape transport means of said tape deck;
   a cam gear having a number of teeth and driven by said transmission gear and driving said first arm driving means; and
   a ramp gear, having a finite number of teeth differing from the number of teeth in said cam gear, driven by said transmission gear and driving said second arm driving means.

4. The apparatus described in claim 1 wherein the driving means comprise:
   a first arm driving means adapted to be driven by said tape transport means and to drive said arm about said pivot means in a direction parallel to the tape path;
   a first spring biasing said arm into contact with said first arm driving means;
   a second arm driving means adapted to be driven by said tape transport means and to drive said arm about said pivot means in a direction perpendicular to the tape path;
   a second spring biasing said arm into contact with said second arm driving means;
   a transmission gear inside said frame adapted to engage said tape transport means of said tape deck; and
   a gear driven by said transmission gear and driving said first and second arm driving means.

5. For use with a cassette tape deck having a capstan and pinch roller, and powered by tape transport means to move recording tape in a standard cassette in a path adjacent to and past a play and/or record tape head, an apparatus for cleaning the tape head, capstan, and pinch roller utilizing power from the tape transport means of the cassette tape deck, comprising:
   a frame;

a first arm having a first end terminating nearly adjacent to the tape head;

a first cleaning pad attached to said first end of said first arm adapted to wipe across the tape head;

pivot means for pivotally supporting said first arm within said frame about a pivot point to allow motion of said first cleaning pad both parallel to and perpendicular to the tape path;

driving means for effecting reciprocal motion of said first arm parallel to and perpendicular to the tape path; and a second arm attached to said frame adapted for movement within said frame nearly adjacent the capstan and pinch roller, a second cleaning pad made of resilient absorbent material mounted on said second arm adjacent the capstan and pinch roller, and spring means biasing said second arm toward a position wherein said second cleaning pad rubs against the capstan and pinch roller.

6. An apparatus for cleaning a tape head, a capstan, and a pinch roller in a cassette tape deck using power from the tape transport means of said deck which is adapted to move recording tape in a standard cassette in a plane adjacent to and past the tape head, comprising:

a box-like frame having the dimensions of a standard cassette and adapted to be inserted into a tape deck;

an elongated arm assembly including an elongated arm pivotally mounted inside the frame near the center of the frame and capable of movement both parallel to and perpendicular to the tape path, a pad adapted to wipe said tape head, and a first end of said arm mounting said pad at a location where the tape head engages said frame;

cam means engaging said arm, adapted for producing in said arm simultaneous movement both parallel to and perpendicular to the tape path, including a spur gear, a cylindrical cam fixedly located atop and driven by said spur gear, said cylindrical cam adapted for producing movement in said arm parallel to the tape path, and a ramp cam on the upper lateral surface of said spur gear adjacent said cylindrical cam, the ramp on said ramp cam extending approximately semi-circularly about said spur gear, said ramp cam adapted for producing movement in said arm perpendicular to the tape path;

spring means biasing said arm against the cylindrical and ramp surfaces of said cylindrical cam and said ramp cam, respectively;

a transmission gear engaging the tape transport means of the tape deck and transmitting power from the transport means to said spur gear; and a capstan and pinch roller cleaning assembly including a pad carrying arm attached to said frame adapted for movement within said frame, and having one end adjacent said tape head, a cleaning pad made of resilient absorbent material mounted on said arm adjacent said tape head and spring means biasing said pad carrying arm toward a position wherein said cleaning pad rubs against said capstan and pinch roller.

7. An apparatus for cleaning a tape head in a cassette tape deck using power from a tape transport means of the tape deck which move recording tape in a standard cassette in a path adjacent to and past said head comprising:

a frame;

an arm pivotably attached inside said frame capable of movement in both a direction parallel to the tape path and perpendicular to the tape path, having a first end terminating nearly adjacent to the tape head;

a cleaning pad attached to said first end of said arm adapted to wipe across the tape head;

pivot means for pivotally supporting said arm within said frame about a pivot point to allow motion both parallel to and perpendicular to the tape path;

a rotating cam engaging said arm for producing arm movement parallel to the tape path;

a rotating ramp engaging said arm for producing arm movement perpendicular to the tape path; and a transmission gear obtaining power from said tape deck and transmitting such power to said rotating cam and rotating ramp.

* * * * *